Aug. 10, 1965

A. T. ROPER 3,199,813

AIRCRAFT AIRFOIL PODS

Filed June 3, 1964

INVENTOR.
ALAN T. ROPER
BY
Erwin F. Adams
ATTORNEY

INVENTOR.
ALAN T. ROPER
BY Erwin F. Adams
ATTORNEY

Aug. 10, 1965 A. T. ROPER 3,199,813
AIRCRAFT AIRFOIL PODS
Filed June 3, 1964 4 Sheets-Sheet 3
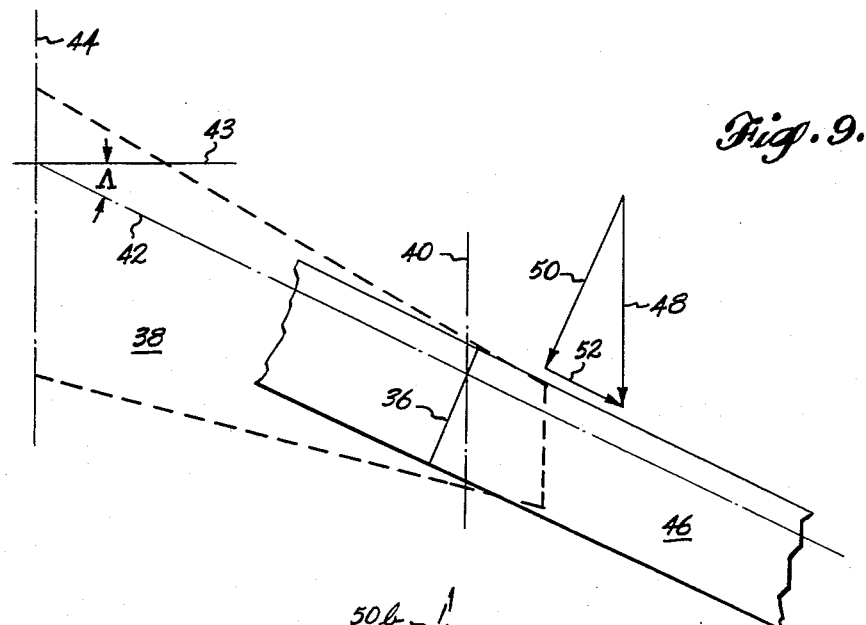
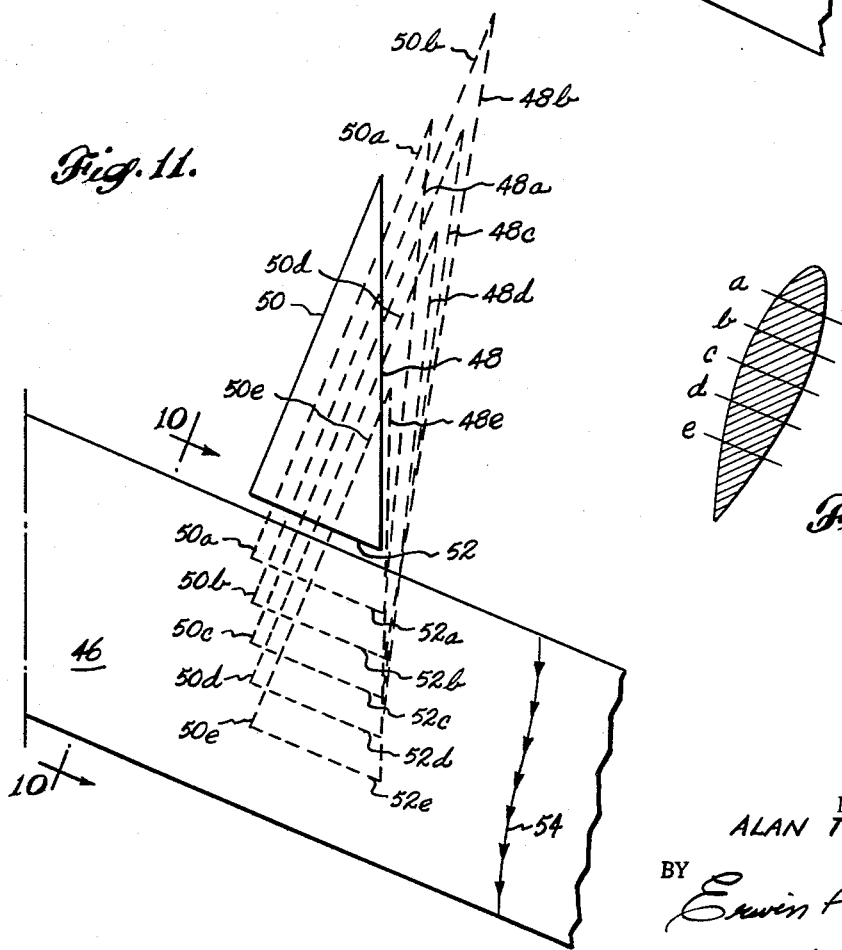
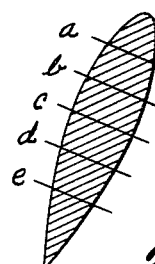
INVENTOR.
ALAN T. ROPER
BY
ATTORNEY Aug. 10, 1965    A. T. ROPER    3,199,813
AIRCRAFT AIRFOIL PODS
Filed June 3, 1964    4 Sheets-Sheet 4

INVENTOR.
ALAN T. ROPER
BY
Erwin F. Adams
ATTORNEY

3,199,813
AIRCRAFT AIRFOIL PODS
Alan T. Roper, Covina, Calif., assignor to The Boeing Company, Seattle, Wash., a corporation of Delaware
Filed June 3, 1964, Ser. No. 372,143
6 Claims. (Cl. 244—135)

This invention relates to containers and more particularly to containers for mounting on an aircraft airfoil.

It is known that certain improvements in aircraft performance may be derived by the use of non-planar wings. One common type of non-planar wing comprises a flat span with vertical endplates at the span ends extending above and/or below the flat horizontal span. Certain disadvantages attend the use of endplates mitigating their utility, however, such as increased weight and increased friction drag. Another problem with endplates is the aerodynamic interference resulting from the wing tip-endplate intersection. The former disadvantages may be offset by utilizing as an endplate the inboard surface of a container mounted on an airfoil of an aircraft designed to use such containers for carrying fuel or equipment. The aerodynamic interference between the container and airfoil, however, may continue to derogate the benefits of the endplate effect performed by the containers.

It is an object of this invention, therefore, to minimize the aerodynamic interference between an airfoil and a container mounted thereon.

Another object of this invention is to provide for the elimination of aerodynamic interference between an elongated container and an airfoil by contouring the container surface attached to the airfoil to conform to contiguous two-dimensional streamline paths of air around the airfoil.

Other objects and advantages of this invention will become apparent when taken in connection with the accompanying drawings in which:

FIGURE 9 is a diagrammatic view of an infinite yawed wing used to determine the streamlines shown in FIGURES 1 and 2;

FIGURE 10 is a typical airfoil section of the yawed wing shown in FIGURE 9;

FIGURE 11 is a diagrammatic view of the method for determining the streamline paths shown in FIGURES 1 and 2;

Non-planar wings, the most common example of which is a flat span wing having endplates, may be used for increasing the aerodynamic efficiency of a wing form. This increase results from the improvement in the effective aspect ratio. However, several disadvantages are attendant to this type of wing form; greater friction drag on the wing surface due to the larger wetted area, movement of the centroid of lift outboard resulting in higher bending moments and therefore increased weight due to heavier structure, and aerodynamic interference between the endplate and wing. These latter deleterious effects have severely limited the practical application of endplates to aircraft.

In the design of aircraft, it has been found advantageous to use pods or containers on the tip of an airfoil, particularly the wing. These pods may be used to contain fuel to house electronic packages or to contain hose drogue refueling equipment. In this area of aircraft design, the disadvantages of the endplates mentioned above are largely off-set since they are inherent in the wing pod design itself. The pods, therefore, may be effectively used as endplates.

Figure 1:
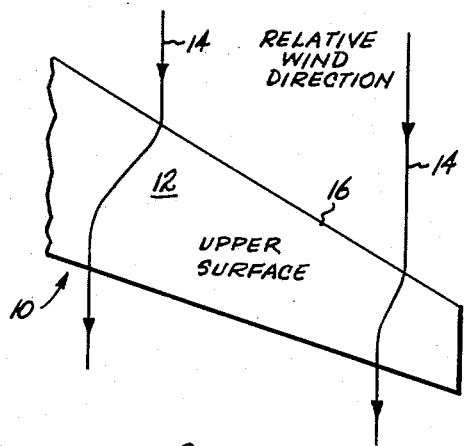
FIGURE 1 is a diagrammatic view of airflow streamlines on the upper surface of a swept airfoil.
Figure 2:
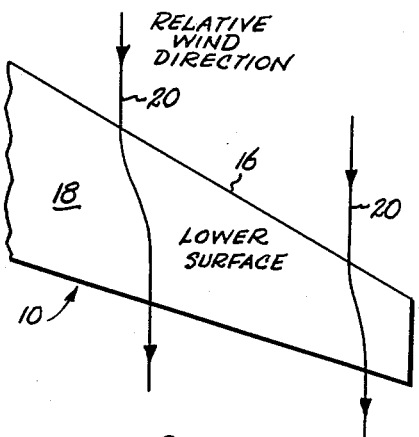
FIGURE 2 is a diagrammatic view of airflow streamlines on the lower surface of a swept airfoil.

The aerodynamic interference between an endplate and a wing, and thus between a pod and the wing, are particularly acute in the design of aircraft with swept wings. It is for this reason that wing pods have not been readily adopted for swept wing aircraft. The severity of the aerodynamic interference, on a swept wing aircraft, is due to distortion of the path of the two-dimensional streamlines around the wing caused by the presence of the pod. This is particularly severe in the area adjacent to the pod. "Two-dimension streamlines" may be succinctly defined for present purposes as the paths of motion of fluid elements for steady motion with velocity components in only two directions. Each of these paths are lines of flow along which the "stream function" is constant. This stream function is a single function which defines both components of velocity at all points in the field of flow (the third component of velocity is assumed to be zero as indicated by the term "two-dimensional"). The two-dimensional streamline paths around a wing 10 are shown in FIGURES 1 and 2. In FIGURE 1, the upper surface 12 of wing 10 is shown to have streamline paths 14. The supervelocity effect of the surface 12 increases the component of the velocity which is normal to the wing leading edge 16. The velocity component parallel to the leading edge 16 remains unchanged over the wing surface 12. As a result, the streamlines 14 tend to turn inboard. The supervelocity effects over the pressure recovery portion of the wing tends to return the streamlines to the free stream directions. In FIGURE 2, the lower surface 18 of wing 10 is shown having streamlines 20 which are deflected in the opposite sense to the streamlines 14. These upper and lower surface streamline paths indicate that substantial interaction of the flow paths will result with a conventional pod mounted on the wing tip will result.

Figure 6:
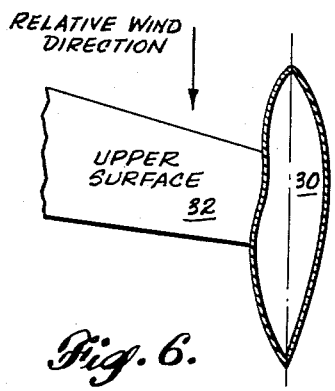
FIGURE 6 is a cross-sectional plan view of a second modified container mounting.
Figure 5:
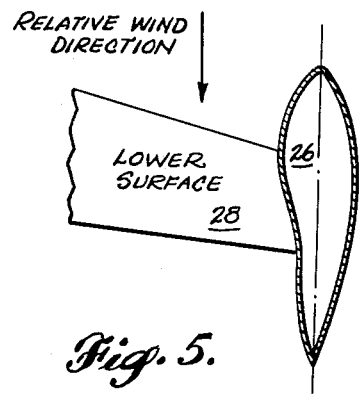
FIGURE 5 is a cross-sectional plan view of a modified container mounting.
Figure 8:
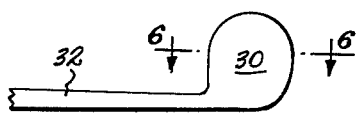
FIGURE 8 is a cross-sectional elevation view of the container shown in FIGURE 6.
Figure 7:
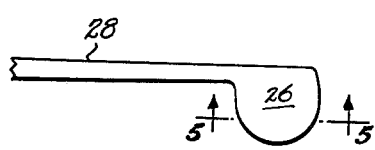
FIGURE 7 is a cross-sectional elevation view of the container shown in FIGURE 5.
Figure 3:
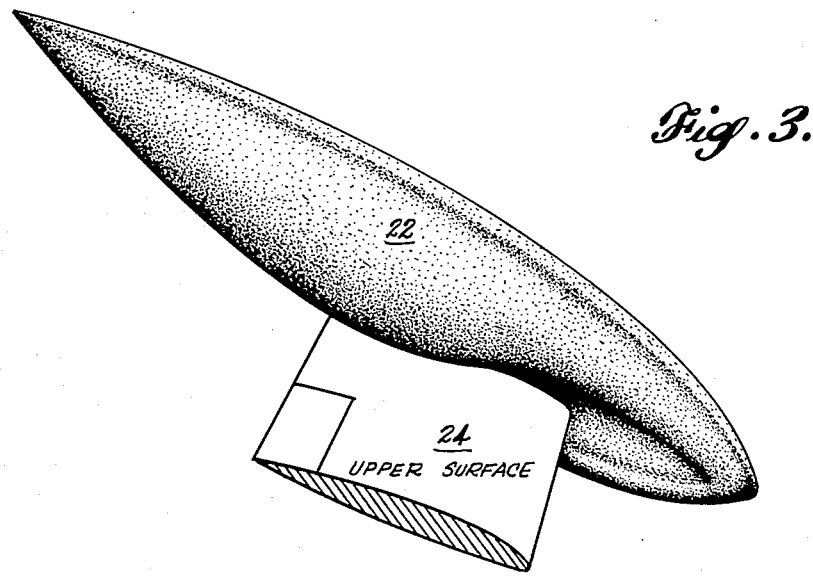
FIGURE 3 is a perspective view of a container in accordance with the present invention.
Figure 4:
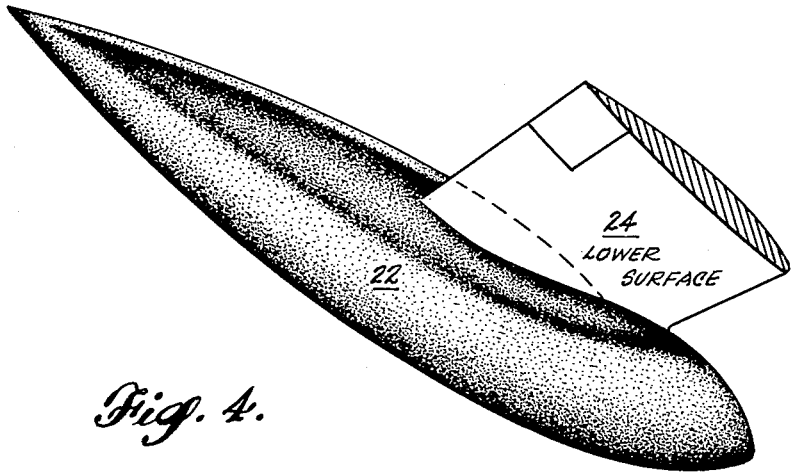
FIGURE 4 is another perspective view of the container in FIGURE 3.

The present invention attenuates the aerodynamic interference problem by "streamline-contouring" the pod shape, i. e. to shape the endplate or pod surface adjoining the pod-wing mounting so as to conform to the shape of the two-dimensional streamline paths around the wing contiguous to this mounting area. This contouring eliminates the interference since the flow will remain two-dimensional, i. e. the streamlines will not intersect the plane of the endplate since the latter is shaped to have a surface which has the same contour as the streamlines. FIGURES 3 and 4 show a pod 22 according to the present invention mounted on the tip of a swept wing 24. The plane of the wing intersects the pod so that a portion of the pod extends above the wing and the lower portion beneath the wing. As seen from FIGURES 5 and 7, however, the pod 26 may be attached to the wing 28 so that the entire body of the pod is below the wing surface. In FIGURES 6 and 8, the pod 30 is mounted on the tip of wing 32 so that the pod is completely above the wing. It will therefore be realized that the vertical location of the contoured pod relative to the airfoil on which it is to be mounted in no way affects the teachings of the present invention; consequently, only the first mentioned pod will be described below.

A typical method of designing the wing-tip pod 22 follows. Referring to FIGURE 9, a reference airfoil section 36 is selected for a swept wing 38 by choosing a line 40 on the wing 38 sufficiently inboard of the tip so that the streamline deformation, described above, is clearly extant. The reference airfoil section 36 is then established as a section normal to the quarter-chord line 42 of the wing 38 passing through the intersection of lines 42 and 40. The airfoil section chord of the reference section 36 is equal to the chord of the airfoil on line 40 times the cosine of the angle of sweep $\Lambda$ measured between the quarter-chord line 42 and a line 43 perpendicular to the axis of symmetry 44 of the aircraft (not shown).

A chordwise vorticity distribution for the airfoil section 36 is found by a suitable method such as the vorticity polygon method. The vorticity polygon method involves the location of a finite number of point vorticities over the surface of an airfoil. According to airfoil theory, which is well known in the art, a point vortex is used to establish the velocity field about any such point. The size and shape of the airfoil generally indicates the strength and arrangement of the point vorticities distributed on the airfoil surface. In this manner the velocity distribution over the airfoil surface may be readily derived. The vorticity distribution about the airfoil is also a function of the angle of attack of the airfoil with respect to the free-stream velocity direction. In order to obtain a pod configuration which provides maximum aerodynamic efficiency, the angle of attack chosen for design is preferably that which corresponds to the airfoil angle of attack during aircraft cruise conditions. The vorticity distribution is then calculated at this angle of attack; it being understood, however, that angles of attack other than at cruise condition may be chosen depending upon various factors.

The streamline paths may be determined from the vorticity distribution around an infinite yawed wing 46 by methods well known in the art. The velocity chosen at which the streamlines are to be established is preferably the aircraft cruise speed. Since the present invention is particularly useful on swept wing aircraft, a sweep angle $\Lambda$ (measured between a line drawn perpendicular to the aircraft longitudinal axis and a line drawn through the quarter-chord points of the yawed wing) of 35° was assumed. It is understood that design of the pod for a particular aircraft would involve the use of that aircraft's design sweep angle. The infinite yawed wing theory used to determine the streamline paths is not susceptible of simple explanation but is well recognized by those skilled in the art. It can be best described as follows. The freestream velocity 48 shown in FIGURE 9, can be divided into two components: velocity component 50 normal to the yawed wing leading edge and component 52 parallel to the wing leading edge. Aerodynamic swept wing theory indicates that the velocity component 52 is unaffected by the thickness of the wing 46. The component 50, however, is dependent upon the wing thickness, so that it increases as the thickness increases rearwardly of the leading edge and then decreases as the thickness decreases further rearward toward the wing trailing edge. A typical airfoil section of wing 46 is shown in FIGURE 10 with several chordwise reference lines indicated thereon. In FIGURE 11 the variation in the upper surface normal velocity component 50 is shown at various points on wing 46 as $50a$, $50b$, $50c$, $50d$ and $50e$. Since the parallel velocity components $52a$ through $52e$ are constant, the total airstream velocity 48 may be seen to vary. As the thickness increases rearward of the leading edge to point $a$, the total velocity component $48a$ on the wing upper surface changes its direction toward the wing root. This change continues until point $c$ is reached where the thickness begins to decrease and the total velocity components $48c$, $48d$ and $48e$ return to the freestream total velocity direction 48. The path of the velocity components are synthesized to form a streamline path 54. By this method, the two-dimensional streamline paths over the entire wing span and particularly in the immediate vicinity of the reference chord may be calculated and plotted.

Figure 12:
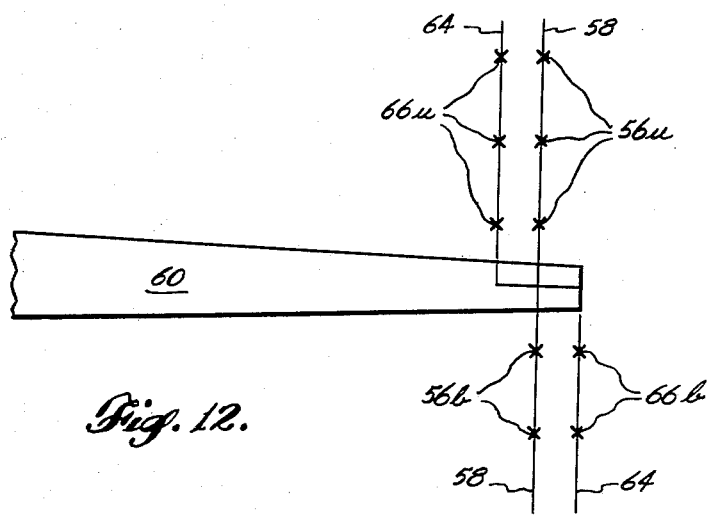
FIGURE 12 is an elevation view of a wing showing the "control-stations" of the associated streamlines.
Figure 13:
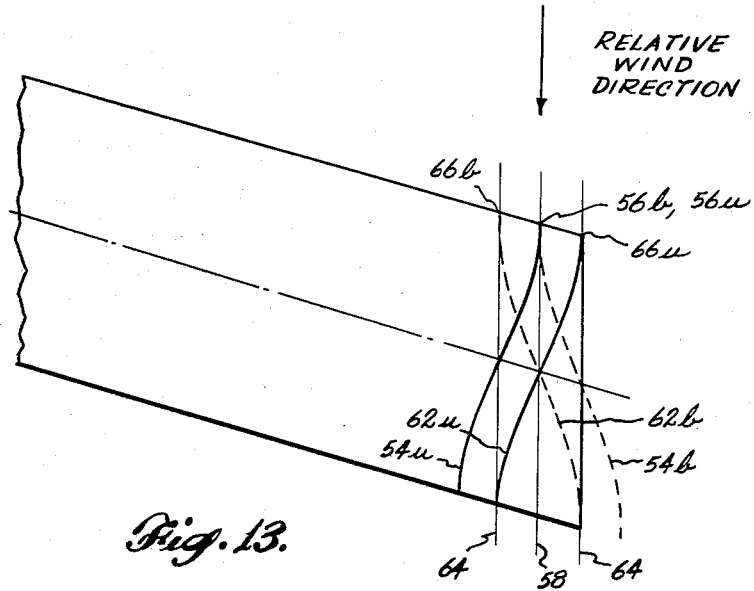
FIGURE 13 is a plan view of the wing and streamlines shown in FIGURE 12.

The streamline paths, such as 54, having been determined, a number of "control stations" 56 may be established for each streamline in a freestream velocity plane 58, as seen in FIGURE 12. A "control station" is defined as the point at which a streamline either above or below the wing 60, has zero lateral deflection; the vertical plane 58 passes through the intersection of the reference chord 36 and the wing leading edge. The points of zero deflection $56u$ and $56b$ for upper and lower surface streamlines $54u$ and $54b$ are at the leading edge of the wing. As noted in FIGURE 13, however, the streamline paths $54b$ and $54u$ rearward of the leading edge diverge. To obtain a pod cross section which has greater stability when its inner mounting surface is contoured, the streamlines $54b$ and $54u$ were shifted so that the paths above and below the wing intersect as the 50% chord point as shown in FIGURE 13, rather than at the wing leading edge. The adjusted streamline paths $62b$ and $62u$ cause a discontinuity in the plane 58 to form a plane 64 having control stations $66b$ and $66u$. This discontinuity resulting in a stepped plane 64, which is to be used to contour the endplate surface of the pod, has no effect on the endplate aerodynamic characteristics. Moreover, by adjusting the streamlines a lesser portion of the upper wing surface, which is the most efficient lift producing area, is covered by the pod. It is to be understood that the point chosen for intersection of the streamline paths, i.e. the 50% chord point, may differ for particular aircraft design configuration.

The streamline paths intersecting the plane 64 may now be used to contour a flat plate or endplate to conform to the streamlines thereby preventing aerodynamic interference between the plate and the wing. The pod construction is completed by attaching a portion of a cylinder, longitudinally aligned with the aircraft longitudinal axis, to the endplate so that the endplate serves as a chordal plane intersecting the cylinder. The cross-sectional area of the cylinder is determined by the design volume of the pod. The cylinder extends axially approximately over the length of the wing tip; the nose of the pod forward of the wing leading edge is an ogival or like streamlined body axially mounted on the cylinder. The tail section of the pod rearward of the trailing edge is also a body of revolution. However, it is to be realized that the contoured endplate forms the inboard surface of the nose and tail sections as well as the intermediate cylindrical portion section, since the prevention of pod-wing aerodynamic interference requires that these surfaces conform to the streamline paths also. The nose and tail sections, consequently, do not have a continuous smooth surface as does a true body of revolution; but rather have an inboard surface which conforms to the streamline paths so as to prevent aerodynamic interference. The sharp corners on the pod are given generous radii to prevent the formation of vortices and resulting viscous separation.

A container for mounting on an airfoil, having a contoured inboard surface or endplate surface, will therefore be seen to prevent any aerodynamic interference between the pod and the wing thereby minimizing the induced drag of the wing and the interference drag of the wing-pod combination so as to satisfy the objects previously established.

While there has been shown and described the fundamental novel features of this invention as applied to the several embodiments, it will be understood that omissions, substitutions and changes in form and details of the devices illustrated may be made by those skilled in the art without departing from the scope of the invention. It is the intention therefore to be limited only by the scope of the following claims and reasonable equivalents thereof.

I claim:

1. A pod for use in combination with an aircraft having a swept airfoil, said pod comprising an elongated container of noncircular cross section substantially throughout its length adapted to be mounted on said airfoil, said container having closed forward and rearward ends and a longitudinally extending substantially vertically oriented inboard surface which commences forward of the leading edge of said airfoil and extends beyond the trailing edge, said inboard surface forming an end-plate and being contoured to conform to contiguous two-dimensional streamline paths of air existing around said airfoil when the aircraft is moving at substantially cruise velocity.

2. A pod for use in combination with an aircraft having a swept airfoil, said pod comprising an elongated container of noncircular cross section substantially throughout its length adapted to be mounted on said airfoil, said container having closed streamlined forward and rearward sections and an intermediate section having a length extending substantially throughout that of the chord at the pod-airfoil junction, said container having a longitudinally extending substantially vertically oriented inboard surface forming the inboard surface of said intermediate section and extending forward and rearward of said intermediate section, said inboard surface forming an end-plate and being contoured to conform to contiguous two-dimensional streamline paths of air existing around said airfoil when the aircraft is moving at substantially cruise velocity whereby two-dimensional airflow around the airfoil is maintained thereby attenuating adverse pod-airfoil aerodynamic interference effects.

3. A pod in combination with an aircraft swept airfoil comprising an elongated closed-end contoured container of noncircular cross section substantially throughout its length attached to the end of said airfoil, said container having a longitudinally extending substantially vertically oriented inboard surface which commences forward of the leading edge of said airfoil and extends beyond the trailing edge, said inboard surface forming an endplate conforming to two-dimensional streamline paths of air existing contiguous to said container inboard surface over the upper and lower surface of the airfoil when the aircraft is moving at substantially cruise velocity.

4. A pod for use in combination with an aircraft having a swept wing, said pod comprising an elongated container of noncircular cross section substantially throughout its length adapted to be mounted on said wing, said container having closed streamlined forward and aft sections and an intermediate section having a length extending substantially throughout that of the chord at the pod-wing junction, said intermediate section being mounted to said wing at a location wherein the plane of the wing passes substantially through the vertical center of said container so as to divide the container into an upper portion above the wing and a lower portion below the wing, said container having a longitudinally extending substantially vertically oriented inboard surface which commences forward of the leading edge of said wing and extends beyond the trailing edge, said inboard surface forming a wing endplate and being contoured to conform to two-dimensional streamline paths of air existing contiguous to said container inboard surface when the aircraft is moving at substantially cruise velocity whereby two-dimensional airflow around the airfoil is maintained thereby attenuating adverse pod-wing aerodynamic interference effects.

5. The pod for use in combination with an aircraft swept wing of claim 4 wherein said intermediate section is mounted to said wing at a vertical location so that the plane of the wing passes substantially through the lower surface of said container whereby the container is positioned above the wing plane.

6. The pod for use in combination with an aircraft swept wing of claim 4 wherein said intermediate section is mounted to said wing at a vertical location so that the plane of the wing passes substantially through the upper surface of said container whereby the container is positioned below the wing plane.

References Cited by the Examiner

UNITED STATES PATENTS

| | | | |
|---|---|---|---|
| 2,576,981 | 12/51 | Vogt | 244—91 |
| 2,874,922 | 2/59 | Whitcomb | 244—130 |
| 2,984,439 | 5/61 | Fletcher | 244—130 |

FERGUS S. MIDDLETON, *Primary Examiner.*